UNITED STATES PATENT OFFICE.

ROBERT DEMUTH, OF ELBERFELD, GERMANY, ASSIGNOR TO THE FARBEN-FABRIKEN OF ELBERFELD CO., OF NEW YORK, N. Y.

BLUE COTTON DYE AND PROCESS OF MAKING SAME.

SPECIFICATION forming part of Letters Patent No. 673,388, dated May 7, 1901.

Application filed May 12, 1899. Serial No. 716,554. (Specimens.)

*To all whom it may concern:*

Be it known that I, ROBERT DEMUTH, doctor of philosophy and chemist, of Elberfeld, Germany, (assignor to the FARBENFABRIKEN OF ELBERFELD COMPANY, of New York,) have invented a new and useful Improvement in Blue Cotton Dyes and Processes of Making Same; and I do hereby declare the following to be an exact and clear description thereof.

In the specification forming part of the United States Letters Patent, No. 614,538, dated November 22, 1898, I have described the production of blue cotton dye, which process consists in subjecting 1.8-amidonaphtholsulfo-acids to the action of alkaline-sulfid-carrying compounds at elevated temperatures and subsequently treating the resulting melts in a suitable manner in order to isolate therefrom the blue dye, which isolation can be effected by repeatedly treating the melts with small quantities of hot water, filtering off the solutions thus formed, continuing this extraction until the blue dye contained in the melts has been wholly dissolved out, and finally precipitating from the resulting filtrates the blue dye by the addition of a suitable salt. The dyes thus produced are insoluble in water and yield indigo-blue shades when they are applied to cotton in strongly-alkaline baths or in baths containing suitable reducing agents, such as an alkaline sulfid or the like.

I have now found that new technically-valuable cotton dyes likewise yielding blue shades can be obtained in a much cheaper way by mixing 1.8-amidonaphtholsulfo-acids or alkaline salts thereof with alkaline sulfid and zinc (using either metallic zinc, such as zinc dust, or any zinc compound) and subsequently heating the so-formed mixtures at elevated temperatures. The products thus obtained can be directly employed for dyeing purposes, so that a further purification or isolation thereof is unnecessary, which constitutes a material progress in comparison with the process described in the above-cited patent, No. 614,538.

The new coloring-matters distinctly differ from those described in the specification of the aforesaid patent—viz., by their ability to dye cotton without the addition of strong alkalies or reducing-agents and by their property to be almost entirely soluble in water, whereas the products of the former patent are entirely insoluble in water and when employed for dyeing cotton require the use of reducing agents or strong alkalies.

The new dyestuffs when heated with dilute soda-lye or caustic ammonia liquor yield blue solutions, and when stirred into sulfuric acid of 66° Baumé dull bluish-red solutions result. From their solutions in water they are precipitated by the addition of mineral acids, sulfureted hydrogen being set free at the same time. They produce on unmordanted cotton blue shades when they are dyed in baths containing sodium chlorid or sodium chlorid and sodium carbonate or the like. The shades withstand the action of alkalies and are sufficiently fast to the action of light.

In order to carry out my process practically, I can proceed as follows, without limiting myself to the details given. The parts are by weight.

Twenty parts of dry powdered zinc chlorid are stirred into a solution prepared by dissolving one hundred and thirty-two parts of a thirty-eight-per-cent. paste of 1.8-amidonaphthol-2.4-disulfo-acid in sixty parts of soda-lye, (specific gravity 1.3.) Eighty-seven parts of dry sodium sulfid and eighty-two parts of flowers of sulfur are then added. The resulting mixture is slowly heated in an iron vessel, preferably by means of a metallic bath, to 200° centigrade, (temperature of the bath,) taking care that the mass is well stirred and keeping the same at the said temperature until it has become solid and can be easily minced to form a powdery mass. At this stage the vessel is closed, the temperature of the bath is raised to 240° centigrade, and heating at this temperature is continued for about four hours. After cooling the blackish powdery mass thus obtained can be directly used for dyeing. It is soluble in water with a bluish color, a small quantity of a residue remaining thus undissolved, which probably is zinc sulfid. When heated with dilute soda-lye or caustic ammonia liquor, it yields blue solutions, and on stirring the same into sulfuric acid (66° Baumé) a dull bluish-red solution results. From its solutions in water it is precipitated by the addition of mineral acids, sulfureted hydrogen being set free at the same time. It produces blue indigo like shades on unmordanted cotton when it is dyed in boiling baths containing sodium chlorid, sodium chlorid and sodium carbonate, or the like. The shades withstand the action of alkalies and are sufficiently fast to the action of light.

The process proceeds in an analogous manner if in place of zinc chlorid, used in the above example, other zinc compounds—such as zinc sulfate, zinc carbonate, zinc oxid, or the like, or metallic zinc itself (preferably in the form of zinc-dust)—are used. The sodium sulfid and sulfur prescribed in the above example can be replaced by other alkaline-sulfid-carrying compounds—such as sulfur and potassium sulfid, sulfur and soda, sulfur and potassa, sodium polysulfid, potassium polysulfid, or the like. A similar result is obtained if other 1.8-amidonaphtholdisulfo or monosulfo acids are used in place of 1.8-amidonaphthol-2.4-disulfo-acid.

Having now described my invention and in what manner the same is to be performed, what I claim as new, and desire to secure by Letters Patent, is—

1. The process for the production of new dyes giving blue shades on unmordanted cotton which process consists in mixing sulfo-acid compounds of 1.8-amidonaphthol, with alkaline-sulfid and zinc carrying compounds, and subsequently heating the resulting mixtures at elevated temperatures, substantially as described.

2. The process for producing a new dye giving indigo-blue shades on unmordanted cotton in the described dyeing-baths, which process consists in mixing alkaline salts of 1.8-amidonaphthol 2.4-disulfo-acid with sodium sulfid and flowers of sulfur, incorporating zinc to this mass and subsequently heating the resulting mixture at elevated temperatures, substantially as described.

3. As new articles of manufacture the blue dyes obtainable from sulfo-acid compounds of 1.8-amidonaphthol by the action of alkaline-sulfid and zinc carrying compounds at elevated temperatures, forming blackish powdery masses, almost entirely soluble in water with a blue color, soluble in hot dilute soda-lye and caustic ammonia liquor with a blue color, in concentrated sulfuric acid (66° Baumé) with a dull bluish-red color, being precipitated from their solutions in water by the addition of mineral acids, sulfureted hydrogen being set free at the same time, producing on unmordanted cotton in the described dyeing-baths, blue shades fast to the action of alkalies and sufficiently withstanding the action of light, substantially as described.

4. As a new article of manufacture the specific indigo-blue dye obtainable from 1.8-amidonaphthol 2.4-disulfo-acid by the action of alkaline-sulfid and zinc carrying compounds at elevated temperatures, forming a blackish powdery mass, almost entirely soluble in water with a blue color, soluble in hot dilute soda-lye and caustic ammonia liquor with a blue color, in concentrated sulfuric acid (66° Baumé) with a dull bluish-red color, being precipitated from its solution in water by the addition of mineral acids, sulfureted hydrogen being set free at the same time, producing on unmordanted cotton in the described dyeing-baths, bright indigo-blue shades fast to the action of alkalies and sufficiently withstanding the action of light, substantially as described.

In testimony whereof I have signed my name in the presence of two subscribing witnesses.

ROBERT DEMUTH.

Witnesses:
R. E. JAHN,
OTTO KÖNIG.